United States Patent
Bromell et al.

(10) Patent No.: US 9,357,423 B2
(45) Date of Patent: May 31, 2016

(54) NETWORK ELEMENT, INTEGRATED CIRCUIT CELLULAR COMMUNICATION SYSTEM AND METHOD FOR CAPTURING USER EQUIPMENT MEASUREMENTS

(71) Applicant: ip.access Limited, Cambridge, Cambridgesire (GB)

(72) Inventors: John Yearsley Bromell, Great Chesterford Essex (GB); Akram Jamal Masoud Awad, Cambridge (GB); Neil Philip Piercy, Thriplow (GB); James Edward Brereton Harrow, Fulbourn (GB)

(73) Assignee: ip.access Limited, Cambridgeshire (GB)

( * ) Notice: Subject to any disclaimer, the term of this patent is extended or adjusted under 35 U.S.C. 154(b) by 0 days.

(21) Appl. No.: 14/372,417

(22) PCT Filed: Jan. 17, 2013

(86) PCT No.: PCT/EP2013/050868
§ 371 (c)(1),
(2) Date: Jul. 15, 2014

(87) PCT Pub. No.: WO2013/107831
PCT Pub. Date: Jul. 25, 2013

(65) Prior Publication Data
US 2014/0357256 A1    Dec. 4, 2014

(30) Foreign Application Priority Data

Jan. 17, 2012   (GB) .................................. 1200754.8

(51) Int. Cl.
*H04B 1/38*      (2015.01)
*H04W 24/10*     (2009.01)
(Continued)

(52) U.S. Cl.
CPC .............. *H04W 24/10* (2013.01); *H04W 76/06* (2013.01); *H04W 84/04* (2013.01);
(Continued)

(58) Field of Classification Search
CPC ............ H04W 76/045; H04W 76/068; H04W 76/046; H04W 76/048; H04W 76/06; H04W 24/10; H04W 36/00; H04W 36/0088
USPC ........ 455/403, 414.1, 432.1, 432.3, 434, 444, 455/445, 446, 447, 452.1, 452.2, 458, 459, 455/466, 556.1, 557
See application file for complete search history.

(56) References Cited

U.S. PATENT DOCUMENTS

2003/0096601 A1   5/2003  Litwin
2008/0186912 A1   8/2008  Huomo
(Continued)

FOREIGN PATENT DOCUMENTS

| EP | 2437552 A1 | 4/2012 |
|---|---|---|
| WO | 9533347 A1 | 12/1995 |
| WO | 2010137698 A1 | 12/2010 |

OTHER PUBLICATIONS

International Search Report and Written Opinion, issued Jul. 23, 2013 for PCT/EP2013/050868 (28 pgs.).

(Continued)

*Primary Examiner* — Jean Gelin
(74) *Attorney, Agent, or Firm* — Fitch, Even, Tabin & Flannery LLP

(57) ABSTRACT

A communication system comprising a core network operably coupled to a small base station (HNB) arranged to support wireless communications to a user equipment UE is described. The HNB comprises a control processor being arranged in a first embodiment to: support setting up of an air interface connection with the UE to allow the UE and the core network to exchange messages, e.g. for a Location Update procedure and to receive an instruction from the core network via a core network connection to release the connection to the core network; usually, the HNB would transmit a RRC Connection Release message to the UE; however, the UE utilizes this situation to request and receive UE measurements by using RRC Measurement Control/Report messages and thus delays the initiation of the RRC Connection Release procedure towards the UE; in a second embodiment, the control processor is arranged to autonomously page the UE: thus, the UE establishes a RRC connection for responding to the paging message and the HNB may request receive UE measurements.

20 Claims, 8 Drawing Sheets

(51) Int. Cl.

| | |
|---|---|
| H04W 36/00 | (2009.01) |
| H04W 76/04 | (2009.01) |
| H04W 76/06 | (2009.01) |
| H04W 84/04 | (2009.01) |
| H04W 68/00 | (2009.01) |

(52) U.S. Cl.
CPC ...... *H04W 36/0083* (2013.01); *H04W 36/0088* (2013.01); *H04W 68/00* (2013.01); *H04W 76/045* (2013.01); *H04W 76/064* (2013.01); *H04W 84/045* (2013.01)

(56) References Cited

U.S. PATENT DOCUMENTS

| | | |
|---|---|---|
| 2009/0086667 A1 | 4/2009 | Sitomaniemi |
| 2009/0247176 A1 | 10/2009 | Song et al. |
| 2010/0182919 A1 | 7/2010 | Lee et al. |
| 2011/0195715 A1 | 8/2011 | Wu |

OTHER PUBLICATIONS

LG Electronics: "3GPP TSG-RAN WG2 Meeting #58; R2-071928; Discussion on Data Transmission in CELL_PCH", 3GPP Draft; R2-071928 DATA_CELLPH_R1, 3rd Generation Partnership Project (3GPP), Mobile Competence Centre; 650, Route Des Lucioles; F-06921 Sophia-Antipolis Cedex; France, vol. RAN WG2, No. Kobe, Japan; May 4, 2007, pp. 1-4, XP050134814, [retrieved on May 4, 2007] p. 1, "1 introduction"; p. 3, Fig. 3; pp. 3-4, "4 RRC measurement reporting in CELL_PCH".

UK Search Report for Application No. GB1300881.8 issued Jul. 15, 2013.

UK Search Examination report under section 18(3) for Application No. GB1300881.8 issued Jan. 16, 2014.

LG Electronics: "3GPP TSG-RAN WG2 Meeting #58; R2-071928; Discussion on Data Transmission in CELL_PCH," 3GPP Draft; R2-071928 DATA_CELLPH_R1, 3rd Generation Partnership Project (3GPP), Mobile Competence Centre; 650, Route Des Lucioles; F-06921 Sophia-Antipolis Cedex; France, vol. RAN WG2, No. Kobe,Japan; May 4, 2007, 4 pp. 3-4, "4 RRC measurement reporting in CELL_PCH."

Universal Mobile Telecommunications System (UMTS); Radio Resource Control (RRC); Protocol Specification (3GPP TS 25.331 Version 10.6.0 Release 10) © 2012.

NETWORK ELEMENT, INTEGRATED CIRCUIT CELLULAR COMMUNICATION SYSTEM AND METHOD FOR CAPTURING USER EQUIPMENT MEASUREMENTS

CROSS REFERENCE TO RELATED APPLICATIONS

This application is a national phase application of International Application No. PCT/EP2013/050868, filed Jan. 17, 2013, claiming priority to Great Britain Application No. 1200754.8, filed Jan. 17, 2012, which are incorporated by reference herein in their entirety.

FIELD OF THE INVENTION

The field of this invention relates to a network element, at least one integrated circuit, a cellular communication system and a method therefor. The invention is applicable to, but not limited to, a network element and methods for extending the duration of existing opportunities for collecting terminal device measurements and for creating new opportunities for collecting terminal device measurements.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (Node Bs in 3GPP™ parlance) in order to communicate with wireless communication units within a relatively large geographical coverage area. Typically, terminal devices (sometimes referred to as wireless communication units, or User Equipment (UEs) as they are often referred to in 3G parlance, communicate with a Core Network (CN) of the 3G communication system via a Radio Network Subsystem (RNS). A wireless cellular communication system typically comprises a plurality of radio network subsystems, each radio network subsystem comprising one or more (coverage) cells to which UEs may 'attach', and thereby connect to the network. Each macro-cellular RNS further comprises a controller, in a form of a Radio Network Controller (RNC), operably coupled to the one or more Node Bs, via a so-called Iub interface.

The 3GPP has subsequently defined a further generation of mobile telephone standards, known as Long Term Evolution (LTE), which is commonly referred to as 4G. In LTE, a base station is known as an Evolved Node B (abbreviated to eNodeB or eNB). An eNB connects directly to the LTE core network, which is known as the Evolved Packet Core (EPC), there being no equivalent in LTE of the 3G RNC.

Lower power (and therefore smaller coverage area) cells are currently referred to as 'small' cells, with the term femto cells or pico cells typically reserved to refer to a residential small cell. Hereafter, the term small cells will be used to encompass femto cells, pico-cells or similar. Small cells are effectively communication coverage areas supported by low power base stations (otherwise referred to as Access Points (APs) with the term Home Node Bs (HNBs) identifying femto cell access points). These small cells are intended to augment the wide area macro network and support communications to UEs in a restricted, for example indoor, environment. An additional benefit of small cells is that they offload of traffic from the macro network to small cells, thereby freeing up valuable macro network resources.

Typical applications for such femto APs/HNBs include, by way of example, residential and commercial (e.g. office) locations, communication 'hotspots', etc., whereby APs/HNBs can be connected to a core network via, for example, the Internet using a broadband connection or the like. In this manner, small cells can be provided in a simple, scalable deployment in specific in-building locations where, for example, UEs may come into close proximity to a small cell base station. Small cell base stations are intended to enhance the coverage of a UMTS™ Radio Access Network (RAN) within residential and/or private commercial environments, and it is planned that the number of small cell base stations in a macro cell may number thousands. Such small cell base stations may include a Network Listen (NWL) function, whereby the basestation receives and decodes the downlink transmissions from other basestations for the purpose of identifying neighbour cells and their characteristics, though this technique has the limitation that the signal strength or signal quality of a neighbour cell is determined at the location of the small cell base station rather than at locations at which UEs may be located.

In order to support mobility of a UE between cells (for example, handover, cell reselection and RRC redirection), the UE typically has to be able to perform measurements on the signals from neighbouring cells, and generally the network has to provide the UE with information about these cells in the form of neighbour cell lists. It is known in 3GPP™ that Small Cells are often deployed with minimum RF planning and in some cases are installed by consumers within their homes in an adhoc fashion, which can make it difficult for the small cell base station to be given or to obtain complete and accurate information about neighbouring cells. Neighbour cell lists may be based upon: (i) Manual operator provisioning; (ii) NWL mode measurements and (iii) UE measurements. In addition, without correct neighbour cell lists the UE may fail to reselect back to the macro network, may fail to handout the call (resulting in a call drop) or may be redirected to the wrong cell (resulting in call establishment failure). For reliable handover in particular, it is advantageous if a UE can quickly measure the cell or cells to which it is most likely to be able to handover successfully. The more cells a UE has to measure, the longer it takes, so it is advantageous for the AP/HNB only to ask a UE to measure a small number of cells, but the list must be optimised to include those that are most likely to yield handover success.

In general, UMTS UEs support measurement of (a) intra-frequency cells, which are UMTS cells on the same frequency as the serving cell (b) inter-frequency cells, which are UMTS cells on frequencies other than that of the serving cell (c) inter-RAT cells, which are cells that use radio access technologies other than UMTS, such as GSM or LTE. UMTS UEs support the ability to detect and supply measurement results for neighbouring intra-frequency cells about which they have been given no information in advance: such cells are known as 'detected set cells'. UMTS UEs conforming to 3GPP Release 9 or earlier cannot report UMTS detected set inter-frequency cells. UMTS UEs conforming to 3GPP Release 10 may be able to report detected set inter-frequency cells. UMTS UEs cannot report detected set inter-RAT cells.

If a small cell base station does not have complete information about inter-frequency or inter-RAT neighbour cells, it can in principle perform 'blind neighbour cell detection' by giving a UE information for a cell or cells that might or might not exist: the UE will only report measurement results for cells that do actually exist. In this way, the small cell base station can in effect ask a UE to scan through lists of available operating frequencies to find neighbouring cells. Typically the small cell base station has to command a UE to enter 'compressed mode' in order to measure inter-frequency and inter-RAT cells. Since 'compressed mode' uses more radio resources, UEs are typically only asked to measure inter-frequency and inter-RAT cells when they are near the edge of a cell, where handover to a neighbour cell is likely to be required. In such circumstances, it is important for the UE to be able to measure the best neighbour cell for handover quickly, and therefore it would be disadvantageous to ask the UE to perform measurements for any other purpose (including, but not limited to, 'blind neighbour cell detection') at the same time. Typically, the opportunities for asking UEs to perform measurements other than those specifically needed to support handover are both too few and too limited in duration to support neighbour cell list optimisation for Small Cells.

SUMMARY OF THE INVENTION

Accordingly, the invention seeks to mitigate, alleviate or eliminate one or more of the above mentioned disadvantages, either singly or in any combination. Aspects of the invention provide a network element, an integrated circuit a cellular communication system, a method and tangible computer product for provisioning communication units, as described in the appended claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1:
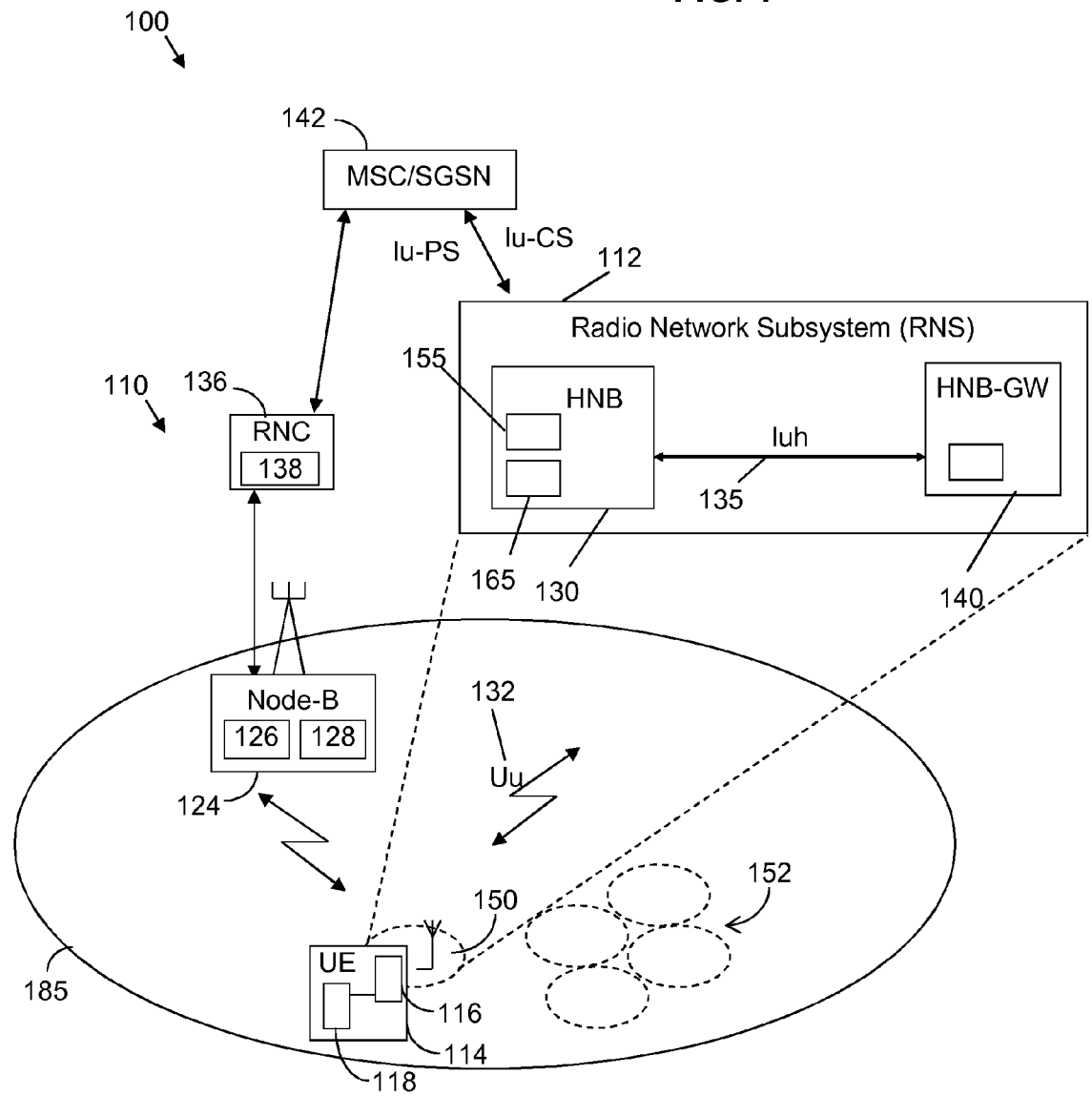
FIG. 1 illustrates an example of part of a cellular communication system.

Examples of the invention will be described in terms of a network element within a 3rd generation (3G) Radio Network Sub-system (RNS) for supporting one or more femto cells within a Universal Mobile Telecommunications System (UMTS™) cellular communication network. However, it will be appreciated by a skilled artisan that the inventive concept herein described may be embodied in any type of network element for supporting communications within a cellular communication network. In particular, it is contemplated that the inventive concept is not limited to being implemented within a network element for supporting one or more small cells within a UMTS™ cellular communication network, but may be equally applied within one or more network element(s) adapted to support any type of communication cell, e.g. one or more macro cells, and/or adapted in accordance with alternative cellular communication technologies including, but not limited to, long term evolution (LTE). Similarly, although examples of the invention are described with reference to requesting more or less frequent measurements from a user equipment (UE), it is envisaged that the inventive concept may be applied to any type of terminal device or subscriber communication unit In a known wireless communication system, UE measurements are captured because the Network has, by sending a 'measurement control' message, asked the UE to send measurement results, either periodically or under some RF threshold condition change. The UE responds with a measurement report message containing measurement results after some period/upon threshold trigger. One common use of such measurements is to support handout of the UE to a new cell, if that cell becomes a better peer for the communications to continue, e.g. as the UE moves out of the coverage of the current serving cell, and such measurements are only performed when a UE has an active connection to the network for a purpose such as making a voice call, transferring PS data, and location updating. In contrast, the present invention provides opportunities for obtaining UE measurements when there is no other reason for the UE to have a connection to the network, thus allowing a UE-based "drive test" approach: to obtain measurements from them to characterise the RF environment of the serving cell and to detect and measure possible neighbour cells. In this manner, examples of the invention provide for a mechanism to enable a Small Cell device to make more attempts to use passing UEs to generate UE measurement reports without the need for them to be engaged in a voice call or data session with the Core Network. Thus, known techniques fail to suggest a concept of the radio access network (RAN) extending core network (CN) procedures in order to enable the UE to make and report measurements, or autonomously paging UEs in the CELL_PCH state, URA_PCH state or Idle Mode state, purely to obtain measurements from them.

Thus, examples of the invention provide for a communication system comprising a core network operably coupled to a network element arranged to support wireless communications to a terminal device. The network element comprises a control processor arranged to: support setting up of an air interface connection with the terminal device to communicate with the core network; receive an instruction from the core network via a core network connection to release the air interface connection with the terminal device; and in response thereto maintain the air interface connection with the terminal device to facilitate at least one non-core network communication between the network element and the terminal device. A network element, integrated circuit for a network element and method for supporting wireless communications to a terminal device in a communication system comprising a network element being operably coupled to a core network are also described.

The control processor may be arranged to maintain the air interface connection involving at least one from a group of: a location update procedure, a short message service, a background signalling procedure initiated by the terminal device or the network element, e.g. the duration of an RRC connection that was established for the purpose of one of those procedures is extended. The extended time provided by the maintained interface connection may be used to collect measurements from the terminal device.

In other examples of the invention, a communication system comprising a core network operably coupled to a network element arranged to support wireless communications to a terminal device is described. The network element comprises a control processor arranged to autonomously create an air interface connection with the terminal device such that communication between the network element and the terminal device is not initiated by the core network.

The control processor may be arranged to autonomously create the air interface connection by autonomously paging the terminal device. The control processor may use the connection thereby created to send a signalling message to the terminal device with a measurement command for the terminal device to perform at least one measurement procedure within a time period provided by the autonomously created air interface connection.

The measurement command may comprise a request to the terminal device to measure and report at least one neighbour cell received characteristic to the network element. The control processor may be further arranged to instruct the terminal device to perform and report one or more of: at least one inter-RAT measurement, at least one inter-Frequency measurement, or at least one intra-Frequency measurement. The control processor may be further arranged to instruct the terminal device to perform blind detection of at least one neighbour cell.

In some examples, the control processor may be further arranged to initiate a paging procedure with the terminal device on the autonomously created air interface connection. The paging procedure initiated by the network element may comprise at least one from a group comprising: paging an Idle Mode terminal device, paging a CELL_PCH state terminal device, paging a URA_PCH state terminal device. In the case of an Idle Mode terminal device, the paging procedure may trigger an RRC connection establishment procedure to be performed by the terminal device. In the case of a CELL_PCH state terminal device or a URA_PCH state terminal device the paging procedure may trigger a cell update procedure to be performed by the terminal device.

The control processor may be further arranged to process one or more measurements from the terminal device at a radio resource management layer. The network element is further arranged to delay forwarding an indication of a termination of the core network connection to the terminal device until the terminal device has completed the measurement requested by the network element.

For clarity, the term 'neighbouring cell' used herein is intended to encompass communication cells that, for example, may be detected by a UE within the current cell; and the term is not intended to be restricted to immediately adjacent cells.

For clarity, various terms have been used herein to describe a base station's operation, including access point (AP), third generation AP (3GAP), home NodeB (HNB), SmallCell, femto cell, pico-cell, and Node B. In examples herein described, the terms may be used interchangeably, with the term base station encompassing all such embodiments (covering macro, micro, pico and femtocell equipment) in the claims.

For clarity, various terms have also been used to describe a terminal device's operation, including: subscriber unit, user equipment (UE), wireless communication unit. In examples herein described, the terms may be used interchangeably, with the term terminal device encompassing all such embodiments in the claims.

Referring now to the drawings, and in particular FIG. 1, a simplified example of part of a cellular communication system is illustrated and indicated generally at 100. In FIG. 1, there is illustrated an example of a communication system in a form of a third generation partnership project (3GPP™) Universal Mobile Telecommunication System (UMTS™) network 100 that comprises a combination of a macro cell 185 and a plurality of small cells 150, 152. For the example embodiment illustrated in FIG. 1, radio network sub-systems (RNSs) comprise two distinct architectures to handle the respective macro cell and small cell communications.

In the macro cell scenario, the RNS 110 comprises a controller in a form of a Radio Network Controller (RNC) 136 having, inter alia, one or more signal processing module(s) 138. The RNC 136 is operably coupled to at least one Node B 124 for supporting communications within the macro cell 185. The Node B 124 comprises signal processing module 126 and transceiver circuitry 128 arranged to enable communication with one or more wireless communication units located within the general vicinity of the macro communication cell 185, such as User Equipment (UE) 114. The RNC 136 is further operably coupled to a core network element 142, such as a serving general packet radio system (GPRS) support node (SGSN) and/or a mobile switching centre (MSC).

In a small cell scenario, an RNS 112 comprises base station, 130, also known as an access point or a Home Node B (HNB), that is arranged to perform a number of functions generally associated with a cellular communication base station, and a controller in a form of a Home Node B Gateway (HNB-GW) 140. As previously mentioned, in some example embodiments, the number of small cell base stations in a single macro cell may number a few or tens of thousands. As will be appreciated by a skilled artisan, a small cell base station HNB is a communication element that supports communications within a communication cell, such as a small cell 150, and as such may provide access to a cellular communication network via the small cell 150. One envisaged application is that an base station 130 may be purchased by a member of the public and installed in their home. The base station 130 may then be connected to an HNB-GW 140 via an Iuh interface 135, for example implemented over, say, the owner's broadband internet connection (not shown).

Thus, a small cell base station 130 may be considered as encompassing a scalable, multi-channel, two-way communication device that may be provided within, say, residential and commercial (e.g. office) locations, communication 'hotspots' etc., to extend or improve upon network coverage within those locations. An example of a typical third generation (3G) small cell base station for use within a 3GPP™ system may comprise some NodeB functionality and some aspects of radio network controller (RNC) 136 functionality. For the illustrated example embodiment, the small cell base station 130 comprises control processor 165 and transceiver circuitry 155 arranged to enable communication with one or more wireless communication units located within the general vicinity of the small communication cell 150, such as User Equipment (UE) 114, via a wireless interface (Uu) 132.

The 3G HNB-GW 140 may be coupled to the core network (CN) 142 via interfaces, such as circuit switched Iu interface, Iu-CS, and the packet switched Iu interface, Iu-PS, as shown. In this manner, the small cell base station 130 is able to provide voice and data services to a cellular handset, such as UE 114, in a small cell, in the same way as a conventional Node B would in a macro cell, but with the deployment simplicity of, for example, a Wireless Local Area Network (WLAN) access point.

The example cellular communication system 100 illustrated in FIG. 1, may comprise one or more network elements for supporting communication within one or more cells of the communication system 100, such as the small cell base station 130.

In accordance with some example embodiments of the present invention, a signal/control processing module within network element, such as control processor 165 of small cell base station 130 of FIG. 1, is arranged to support setting up of an air interface connection with a terminal device to communicate with the core network; receive an instruction from the core network via a core network connection to release the air interface connection with the terminal device; and in response thereto maintain the air interface connection with the terminal device to facilitate at least one non-core network communication between the network element and the terminal device.

In accordance with some example embodiments of the present invention, a signal/control processing module within network element, such as control processor 165 of small cell base station 130 of FIG. 1, is arranged to autonomously create an air interface connection with the terminal device such that communication between the network element and the terminal device is not initiated by the core network.

Figure 3:
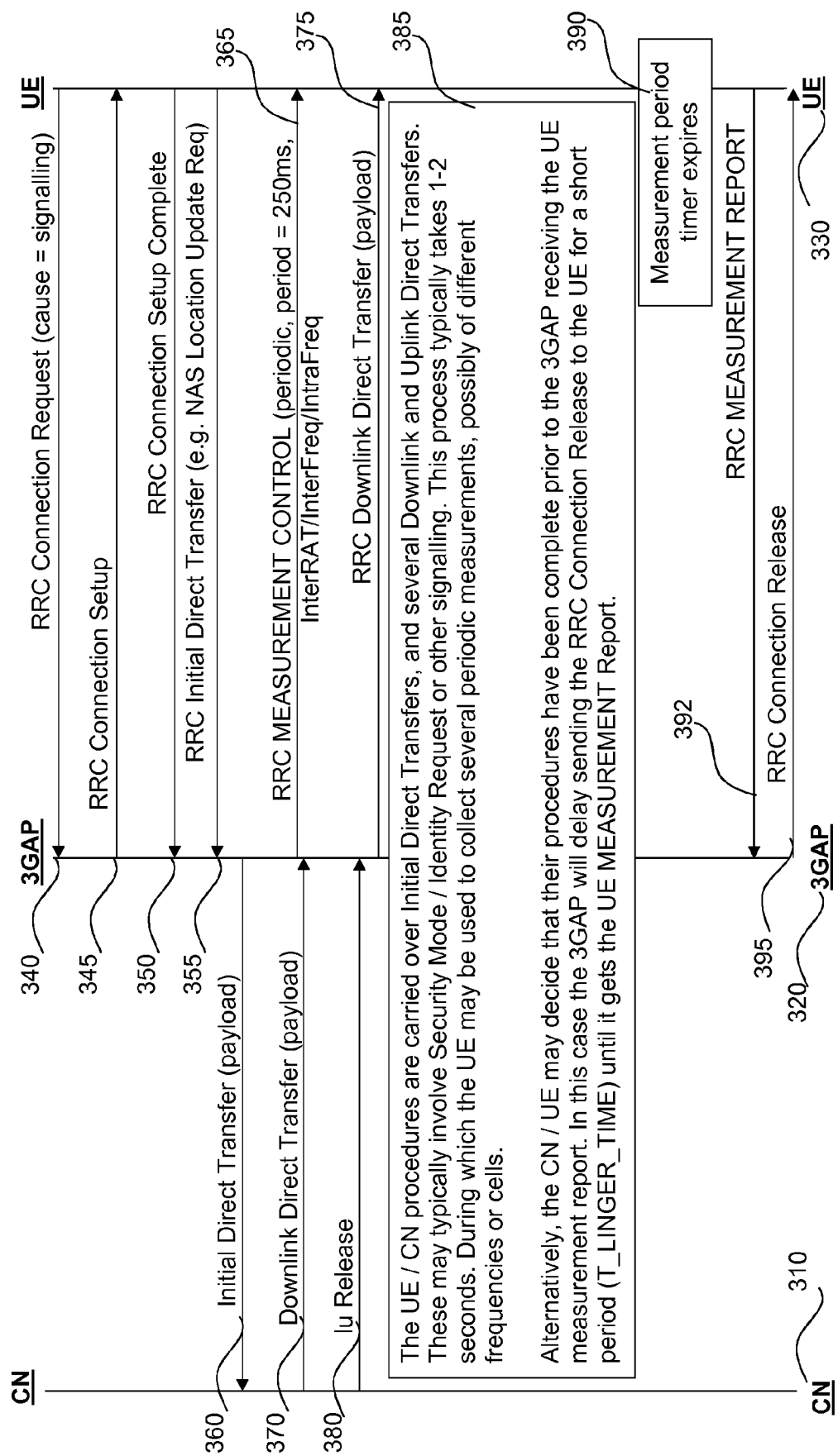
FIG. 3 illustrates an example of a UE initiated procedure to a core network (CN) that can be artificially extended to wait for measurement reports.
Figure 4:
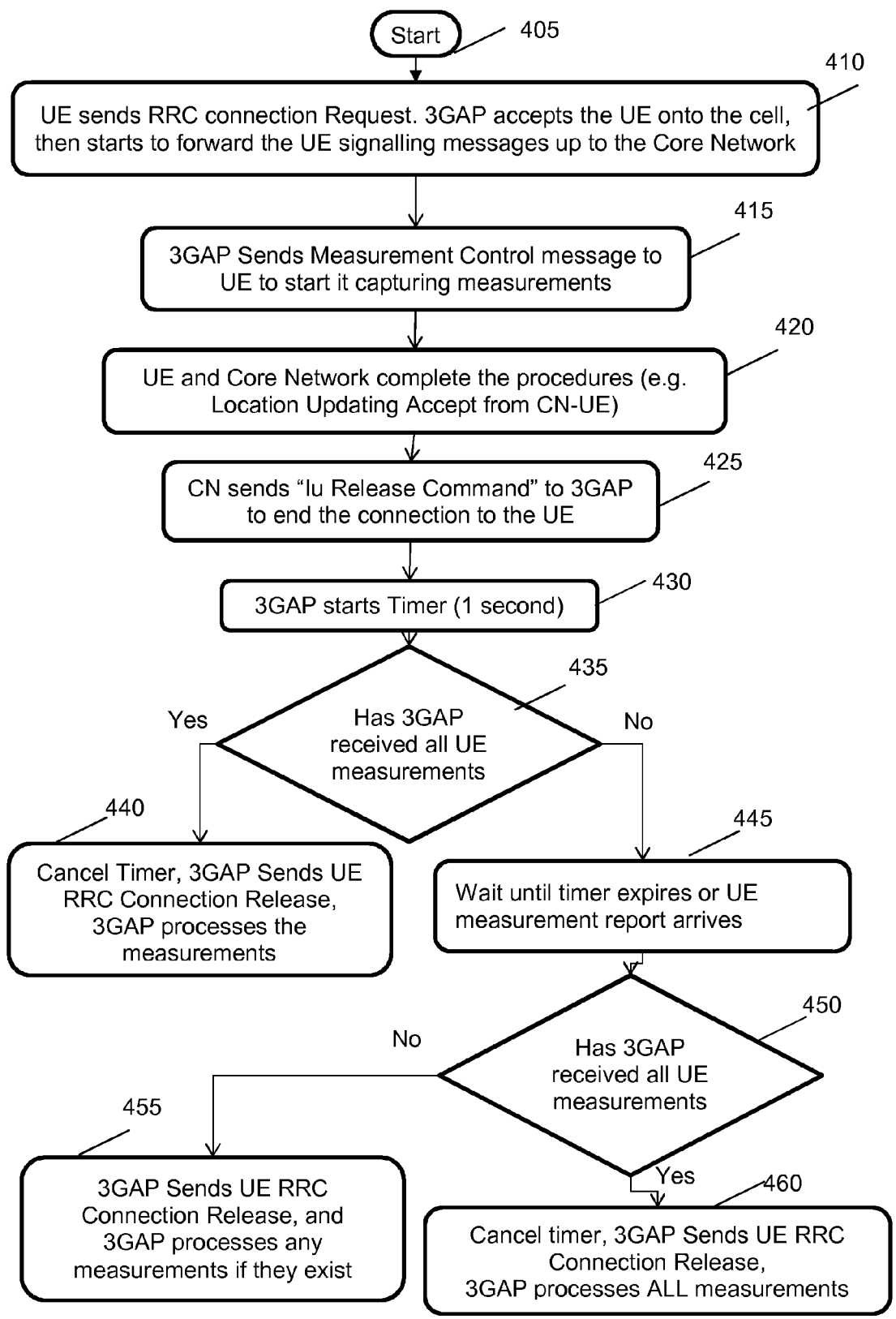
FIG. 4 illustrates a flow chart example of a CN extended procedure accompanying FIG. 3.
Figure 5:
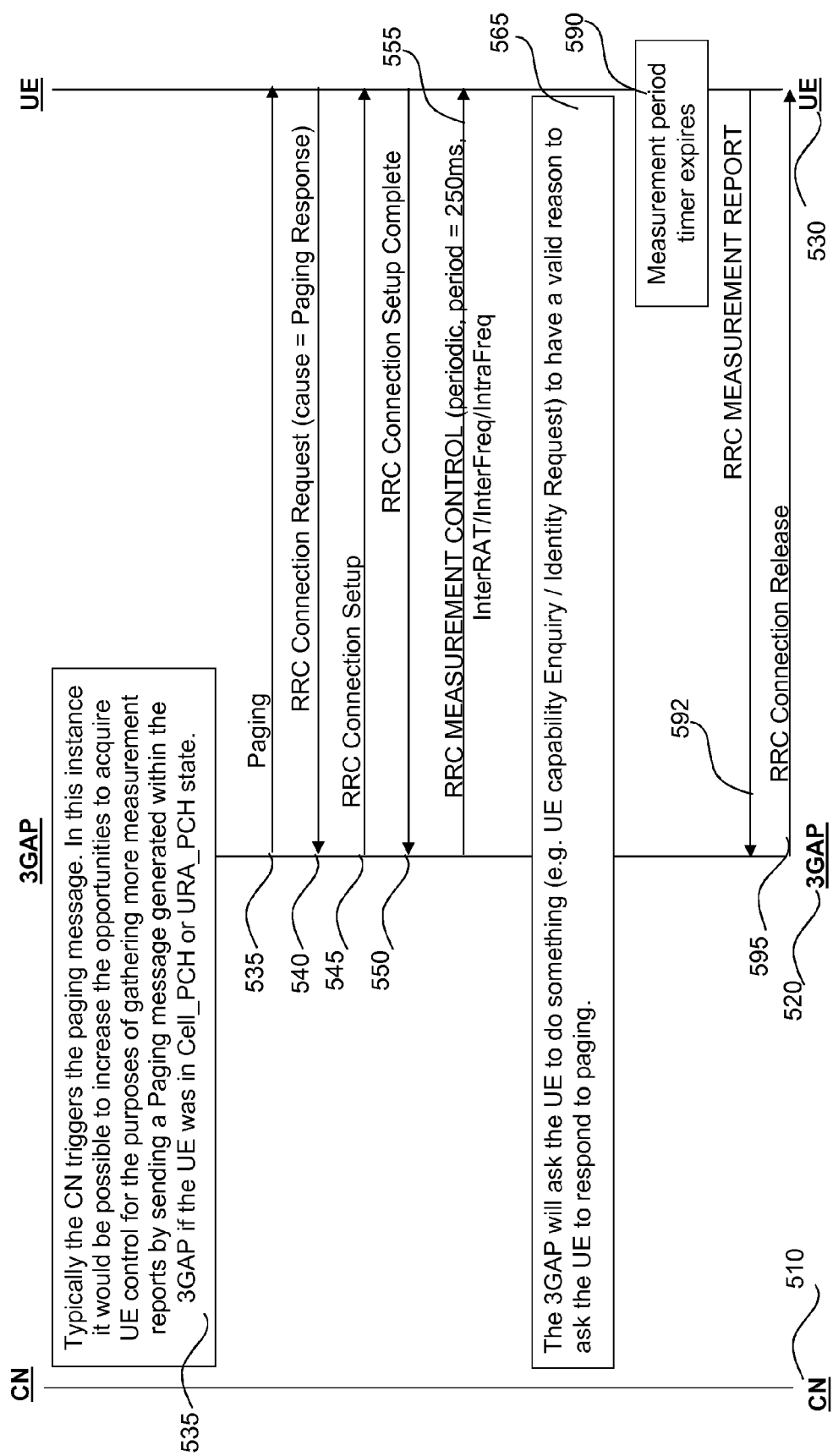
FIG. 5 illustrates an example of a message sequence chart of an Access Point autonomously paging a UE in an Idle Mode state.

As illustrated in FIGS. 3 to 5, upon a 'Location Update Request' (triggered by UE's entering the coverage area or Periodically typically once per hour), 'SMS' or other background signalling procedure that has been initiated by the UE or the Core Network, a processing module in (effectively any apparatus element within) the RAN, for example control processor 165 of the small cell base station/AP, may augment the signalling procedure with one or more UE measurement procedures and if necessary, extend the duration of the signalling connection in order to be able to collect the desired measurement information.

In some examples of the invention, the control processor 165 of the small cell base station/AP may request a UE to measure the signal strength and quality of a specific possible neighbour frequency and scrambling code, and for the UE to try to decode the Cell Global Identity from it, and may delay the release of the signalling connection until the result of the measurement (or an indication from the UE that the measurement has failed) has been received. In some examples, these measurement requests may be standard 3GPP™ messages that are able to be used whenever the UE has an active connection.

In the known art, a signalling connection that is established for the purpose of, for example, Location Updating is released by the Core Network sending an Iu Release Command message at the end of the procedure, and on receiving this message the AP (or in the case of the macro network, the RNC) immediately sends an RRC Connection Release message to the UE. In one example of the invention, a signal processing module in the AP (or RNC) may delay sending the RRC Connection Release message to the UE until it has received the desired measurement results from the UE. In another example, the AP (or RNC) may start a timer on receiving the Iu Release Command message, and send the RRC Connection Release message when the measurement results have been received from the UE or when the timer expires, whichever occurs first.

In addition, in the known art, a UMTS UE that has a connection to the core network for the purposes of transferring Packet Switched (PS) data, but for which for the moment there is no data to be transferred may be placed by the UTRAN into one of two states known as CELL_PCH and URA_PCH. The UE may initiate a transition out of either of these states if, for example, it has data to send, or if it needs to perform a periodic location update. The UTRAN may initiate the UE transitioning out of these states if, for example, the CN sends data to the UE, or if the CN pages the UE (e.g. for a mobile terminated voice call). Similarly, in the known art, a UMTS that does not have an RRC connection to the UTRAN is considered to be in the Idle Mode state. The UTRAN may page such a UE if the CN pages the UE (e.g. for a mobile terminated voice call). In some examples of the invention, a processing module in (effectively any apparatus element within) the RAN, for example control processor 165 of the small cell base station/AP, may trigger a paging message for a UE that is in the CELL-PCH state, the URA_PCH state or the Idle Mode state without there being any stimulus from the UE or CN and initiate UE measurement procedures when the UE responds to the paging and (if no RRC connection already existed) establishes an RRC connection. In this example, the control processor 165 of the small cell base station/AP may then transition the UE back to the CELL_PCH, URA_PCH or Idle Mode state once the measurements are complete, without involving the CN. In some examples this may be done in order to detect previously unknown neighbour cells. In other examples this may be done in order to determine the signal strength and/or quality of one or more already known neighbour cells. In all cases, it may be done periodically, the interval between such procedures being chosen to balance the need to collect measurements with the need to conserve UE battery power.

These measurements may be used, for example by an adaptive algorithm performed in the control processor 165 of the small cell base station/AP, to confirm the presence and strength of known neighbour cells as well as performing blind detection of neighbour cells, if necessary by, for example, placing the UE into 'Compressed Mode' to perform interRAT and/or inter-frequency measurements.

UMTS UE measurements are described in 3GPP™ TS 25.331 section 8.4. According to this, a UE performs measurements on 'measurement objects'. For intra-frequency, inter-frequency and inter-RAT measurements, a measurement object may (and in many cases would) correspond to a cell that is known to the small cell base station/AP, but it need not do so. For intra-frequency measurements, a measurement object is specified primarily by a primary scrambling code (PSC) (the serving cell frequency already being known to the UE); for inter-frequency measurements, each measurement object is specified primarily by a combination of a downlink frequency (identified by a corresponding UTRA Absolute Radio Frequency Channel Number (UARFCN)) and a PSC; for inter-RAT GSM measurements, each measurement object is specified primarily by a combination of a frequency (identified by a corresponding Absolute Radio Frequency Channel Number (ARFCN)) and a Base Station Identity Code (BSIC)). In general, the small cell base station sends a UE a list of measurement objects for which it wants to receive measurements.

In general, the list of measurement objects specified by the AP when it sends a measurement control message to a UE can be constructed in one of several ways (or using a combination of them). In the first case, the 3GAP already has a list of neighbour cells (e.g., provisioned by OAM or obtained using NWL) and it specifies some or all of these cells as measurement objects so that the UE can confirm their presence and their signal strengths or quality measures (e.g., CPICH RSCP or Ec/NO).

In a second case, the 3GAP already has a list of neighbour cells that it has detected using its NWL receiver, and the small cell base station/AP receives and decodes the neighbour cell information that is broadcast by those cells in their System Information messages (e.g. SIB Type 11). The small cell base station/AP then constructs a list of measurement objects corresponding to the decoded neighbour cells that are not already in the small cell base station's/AP's own neighbour cell lists and asks the UE to measure them. In this way the small cell base station/AP can learn about neighbour cells that are detectable by a UE in some locations within the small cell base station's/AP's coverage area (and may therefore by viable handover candidates) even though their signals cannot be detected by the small cell base station/AP itself. In a third case, the small cell base station/AP performs so-called 'blind detection' by specifying a set of UARFCNs and PSCs or a set of ARFCNs and BSICs that it wants the UE to measure in order to detect whether any corresponding neighbour cells are present. For example, an small cell base station/AP may be configured with the (usually) small number of UARFCNs that may be used in the network in which it is operating, and for each UARFCN, ask a UE to scan a subset of the possible PSCs. The small cell base station/AP may ask another UE to scan another subset of the possible PSCs at the same time, or it may ask the same UE to do that once it has finished making the first set of measurements, or it may use a combination of the two approaches. By continuing in this way, eventually all of the relevant UARFCN/PSC combinations may be measured, perhaps over a period of several days.

By performing blind detection as described above, the example process may remove one reason for requiring a network listen (NWL) receiver to be located in a 3GAP. By just using UE measurements obtained during opportunities created by the present invention, there may be no need to ask the user in the instruction manual of their femto Cell to make some test calls after installation, or to rely on the user making voice calls for his or her own purposes. The neighbour cell information obtained by this method may be used to augment the neighbour cell information obtained using NWL or through manual configuration.

Typically a UE must perform a Location Updating procedure before it can make a voice call or establish a PS data session in a cell. By extending the connection used for the Location Updating procedure as described in this invention and asking the UE to make measurements during that connection, the neighbour cell list can be verified and prioritised for a UE prior to it making a call. Since the most appropriate prioritisation of the neighbour cell list may depend on the UE's location within the home, if this procedure takes place shortly before the user makes a call it may be presumed that the UE will not have moved far by the time the call is made and the resulting prioritisation may therefore be considered relevant for handover purposes during the call.

Figure 2:
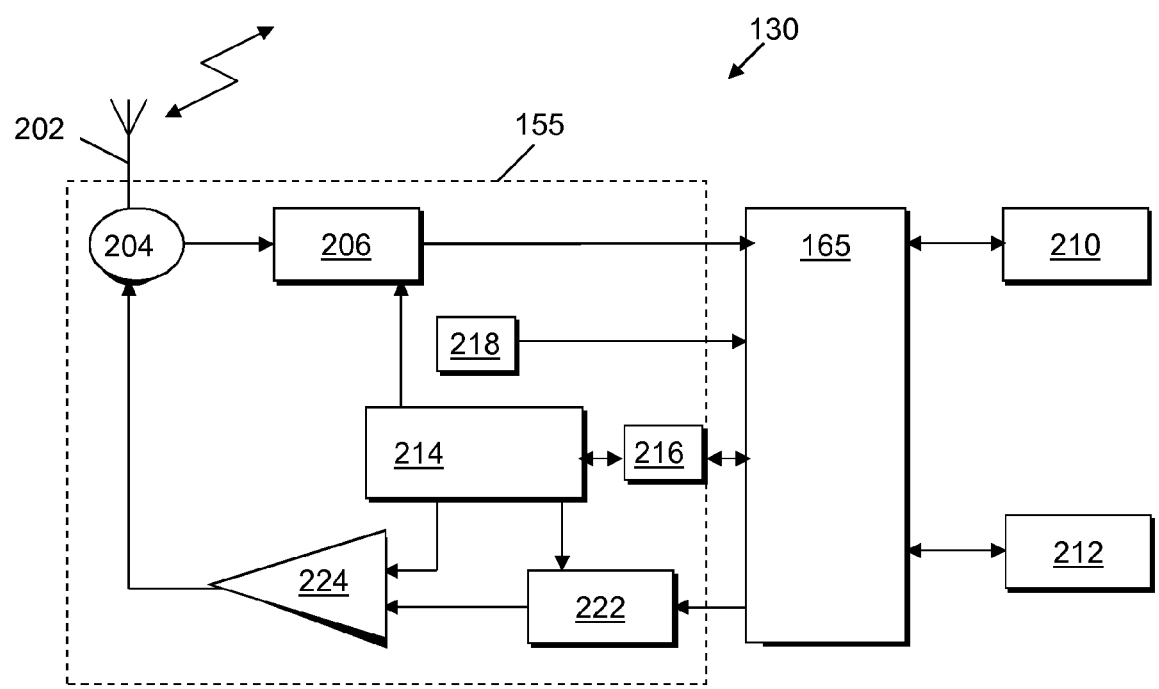
FIG. 2 illustrates an example of a simplified block diagram of a communication unit adapted to provision a communication unit within a communication system with a frequency and scrambling code pair.

Referring now to FIG. 2 for completeness, an example of a simplified block diagram of a small cell base station 130 is shown. The example small cell base station 130 contains an antenna 202 coupled to the transceiver circuitry 155. More specifically for the illustrated example, the antenna 202 is preferably coupled to a duplex filter or antenna switch 204 that provides isolation between receive and transmit chains within the small cell base station 130.

The receiver chain, as known in the art, includes receiver front-end circuitry 206 (effectively providing reception, filtering and intermediate or base-band frequency conversion). The front-end circuitry 206 is serially coupled to the control processor 165. An output from the control processor 165 is provided to a transmit element of a network connection 210, for example operably coupling the control processor 165 to the HNB-GW 140 of FIG. 1 via, say, the Internet (not shown). The controller 214 is also coupled to the receiver front-end circuitry 206 and the control processor 165 (typically realised by a digital signal processor (DSP)). The controller 214 and control processor 165 are also coupled to at least one memory device 216 that selectively stores operating regimes, such as decoding/encoding functions, synchronisation patterns, code sequences, event measurement report data and the like.

As regards the transmit chain, this essentially includes a receiving element of a network connection 210, coupled in series through transmitter/modulation circuitry 222 and a power amplifier 224 to the antenna 202. The transmitter/modulation circuitry 222 and the power amplifier 224 are operationally responsive to the controller 214, and as such are used in transmitting data to a wireless communication unit, such as UE 118.

The control processor 165 in the transmit chain may be implemented as distinct from the processor function in the receive chain. Alternatively, a single processor may be used to implement processing of both transmit and receive signals, as shown in FIG. 2. Clearly, the various components within the small cell base station 130 can be realised in discrete or integrated component form, with an ultimate structure therefore being merely an application-specific or design selection.

In accordance with examples of the invention, the memory device 216 stores computer-readable code thereon for programming the control processor 165 to perform a method for creating additional opportunities for obtaining UE measurements.

Upon a 'Location Update Request' (triggered by UEs entering the coverage area or Periodically typically once per hour), 'SMS' or other background signalling procedure that has been initiated by the UE or the Core Network, a signal processor located anywhere within the RAN, for example control processor 165 of the small cell base station/AP, may augment this procedure with one or more UE measurement procedures that happen at the RRC layer. Whereas typically the core network controls the point at which these signalling procedures complete and the connection to the UE is released, in examples of this invention the release of the connection may be delayed by the base station in order to allow measurements to be made and reported by the UE, as illustrated in the FIGS. In some examples, the signalling procedure may be short-lived (for example less than '1' second), so that it is not adding a noticeable delay to the end of the Iu Release Complete message that is sent back to the Core Network. In addition a signal processor located anywhere within the RAN, for example control processor 165 of the AP, may trigger a paging message for a UE in the CELL_PCH, URA_PCH or Idle Mode state without involving the core network specifically for the purpose of obtaining measurements from the UE (whereas typically the RAN would only page such a UE if it had user data waiting to be sent to the UE or the core network paged the UE).

In some examples, any other signalling procedure may be used. As such, examples of the invention are not limited to either location update request/SMS/background signalling.

In some examples, either or both triggers may be used, dependent upon the particular application.

In some example of the invention, elements other than the AP (in the RAN) may be adapted to implement the inventive concept, such as (in some examples) a standard RNC (a 3GAP is a combination of RNC/NodeB) may be adapted to implement examples of the invention.

Referring now to FIG. 3 there is illustrated a simplified example message sequence chart 300 of a UE initiated procedure that can be artificially extended to wait for measurement reports, for example as may be implemented within the control processor 165 of the small cell base station 130 of FIGS. 1 and 2. The message sequence chart comprises communications between a core network (CN) 310, a 3GAP 320 and a UE 330. The method of operation at the access point (AP), say small cell base station 130 of FIG. 1 and FIG. 2, starts at 340 with the UE 330 sending a radio resource control (RRC) Connection Request message, indicating the cause of the request. The 3GAP 320 returns a RRC Connection Setup message to UE 330 in 345. Once completed, the UE 330 sends a RRC Connection Set-up Complete message to the 3GAP 320, as shown in 350.

In 355, the UE 330 sends a RRC Initial Direct Transfer message to 3GAP 320, for example comprising a NAS Location Update Request. In 360, the 3GAP 320 forwards the Initial Direct Transfer message, including a payload, to the CN 310. In 365, the 3GAP 320 sends a RRC Measurement Control message to UE 330. The RRC Measurement Control message may include periodic information as well as inter-RAT, inter-frequency and/or intra frequency system information. In 370, the CN 310 sends a Downlink Direct Transfer message containing Location Updating Accept to the 3GAP, which in turn forwards this in a RRC Downlink Direct Transfer message to UE 330 in 375. In 380, the CN 310 sends an Iu Release Command message to the 3GAP 320.

In accordance with example embodiments of the invention, and subsequent to the Iu Release Command message being sent to the 3GAP 320, instead of immediately sending an RRC Connection Release message to the UE, the 3GAP waits for the UE 330 to send a specified number of periodic measurements, as shown in 385. As shown in 390, only when the UE has sent RRC Measurement Report 392, the last of the specified number of periodic measurement reports to the 3GAP 320 does the 3GAP 320 send an RRC Connection Release message 395 to the UE 330.

Alternatively, the 3GAP may limit the extent to which sending the Iu Release Complete message is delayed, for example by the 3GAP starting a timer when the Iu Release Command message is received, and if the timer expires before the last of the specified number of RRC Measurement Reports, the 3GAP releases the RRC connection and sends Iu Release Complete.

Referring now to FIG. 4, a flowchart 400 illustrates an example of a CN extended procedure in accordance with the message sequence chart of FIG. 3. The flowchart commences in 405, and moves on to 410 whereby a UE sends an RRC Connection Request message. The 3GAP accepts the UE onto the cell, then starts to forward the UE signalling messages up to the Core Network. In 415, the 3GAP sends a Measurement Control message to the UE to start it capturing measurements. In 420, the UE and Core Network complete the procedures (e.g. by sending a Location Updating Accept message from the CN to the UE). In 425, the CN sends an Iu Release Command message to the 3GAP to end the connection to the UE. In 430, the 3GAP starts a timer of duration T_LINGER_TIME. In 435, a determination is made as to whether (or not) the 3GAP has received all UE measurements. If the 3GAP has received all UE measurements in 435, then the timer is cancelled, in 440 and the 3GAP sends the UE an RRC Connection Release message, and the 3GAP processes the measurements. If the 3GAP has not received all UE measurements in 435, the 3GAP waits until the timer has expired, or the UE measurement report arrives, as shown in 445. In 450, a determination is made as to whether or not the 3GAP received all UE measurements. If the 3GAP has not received all UE measurements in 450, the 3GAP sends an RRC Connection Release message to the UE in 455, and the 3GAP processes any measurements if they exist. If the 3GAP has received all UE measurements in 450, the 3GAP cancels the timer, and sends an RRC Connection Release message to the UE. The 3GAP then processes all the UE measurement reports in 460.

In particular, it is noted that steps 430-460 deviate from standard behaviour, since when the CN sends an 'Iu Release Command' message, the 3G RNC/3GAP should immediately send an RRC Connection Release message to the UE and thereby free up the resources. However, in accordance with example embodiments of the present invention, if the UE measurements in 415 have not arrived within T_LINGER_TIME seconds of the Iu Release Command, then the 3GAP may optionally relinquish waiting for the UE to send the measurement reports. In some examples, the value T_LINGER_TIME may typically be less than 10 seconds, and may not necessarily be an integer number of seconds.

FIG. 5 illustrates an example of a message sequence chart of a radio resource control (RRC) connection establishment procedure. The message sequence chart comprises communications between a core network (CN) 510, a 3GAP 520 and a UE 530. The method of operation at the access point (AP), say AP 130 of FIG. 1 and FIG. 2, starts at 535. In known 3G systems, the CN 510 typically triggers the use of a paging message. However, in accordance with example embodiments, it is possible to increase a number of opportunities to acquire control of the UE, for example for the purpose of gathering more measurement report information, by sending a paging message generated within the 3GAP 520, for example if the UE 530 is in an Idle Mode state. Thus, in this manner, the 3GAP 520 sends a paging message to the UE, as shown in 535. In response to the paging message, the UE 530 sends a radio resource control (RRC) connection request, possibly indicating a cause of the request and associated signalling). The 3GAP 520 returns a RRC connection set-up message to UE 530 in 545. Once completed, the UE 530 sends a RRC connection set-up complete to the 3GAP 520, as shown in 550.

In 555, the 3GAP 520 returns a RRC Measurement control message to UE 530. The RRC Measurement control message may include periodic information as well as Inter radio access technology (RAT), inter-frequency and/or intra frequency system information. In 565, it is shown that the 3GAP 520 may ask the UE to perform a particular role, e.g. respond to a UE capability enquiry or Identity request, in order for there to be a valid reason for the UE to have been sent the paging message 535.

In accordance with example embodiments of the invention, the UE 530 may be used to collect several periodic measurements, which it communicates to the 3GAP by sending one or more RRC Measurement Report messages 592 to the 3GAP 520 and the 3GAP 520 returns a RRC Connection Release message 595 to the UE 530.

Figure 6:
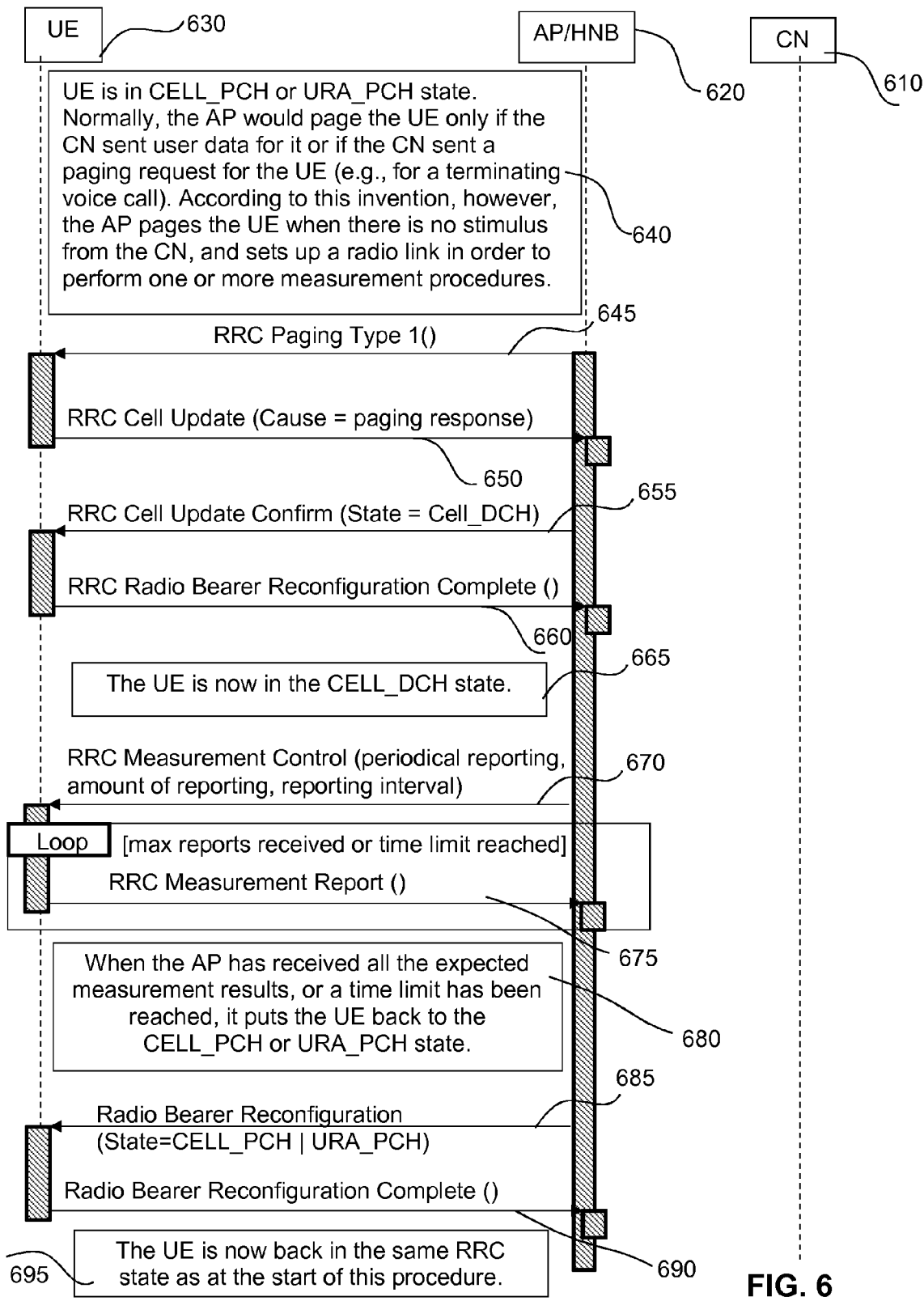
FIG. 6 illustrates an example of a message sequence chart of how a UTRAN generated paging message can be used to trigger a UE in a CELL_PCH or URA_PCH state to contact the cell in order to capture additional measurement reports.

FIG. 6 illustrates an example of how a UTRAN generated paging message can be used to trigger a UE to contact the cell in order to capture additional measurement reports. The message sequence chart comprises communications between a core network (CN) 610, a 3GAP/HNB 620 and a UE 630. The method of operation at the access point (AP), say AP 130 of FIG. 1 and FIG. 2, starts at 640, with the UE in a CELL_PCH or URA_PCH state. In known 3G systems, the AP would only page the UE if the core network (CN) sent user data to it or if the CN sent a paging request for the UE (e.g. for terminating a voice call). However, in accordance with example embodiments, the AP may page the UE when there is no stimulus from the CN, and thus sets up a radio link in order to perform one or more measurement procedures. In this manner, the AP 620 sends a RRC paging message to the UE, as shown in 645. In response to the paging message, the UE 630 sends a radio resource control (RRC) cell update message, indicating a cause of the message being a paging response. The 3GAP 620 returns a RRC cell update confirm message to UE 630 in 655, instructing the UE to transition to a Cell_DCH state or a CELL_FACH state. Once completed, the UE 630 sends a RRC radio bearer reconfiguration complete message to the 3GAP 620, as shown in 660. The UE is now in the Cell_DCH state, as shown in 665, or the CELL_FACH state, depending on what the AP instructs in the RRC Cell Update Confirm message in 655.

In 670, the 3GAP 620 returns one or more RRC Measurement control messages to UE 630, for example requesting periodic reporting. In 675, the UE 630 may collect and send to 3GAP 620 several (for example periodic) measurement reports. As shown in 680, this measurement process will ultimately expire, for example when the 3GAP 620 has received all of the expected measurement results, or a time limit has been reached. At this time the 3GAP 620 sends the UE a radio bearer recongfiguration message 685, indicating that the UE 630 should transition to a Cell_PCH or URA_PCH state. The UE 630 returns a radio bearer recongfiguration complete message 690 to the 3GAP 620 and the UE 630 is now in a Cell_PCH or URA_PCH state 695.

Figure 7:
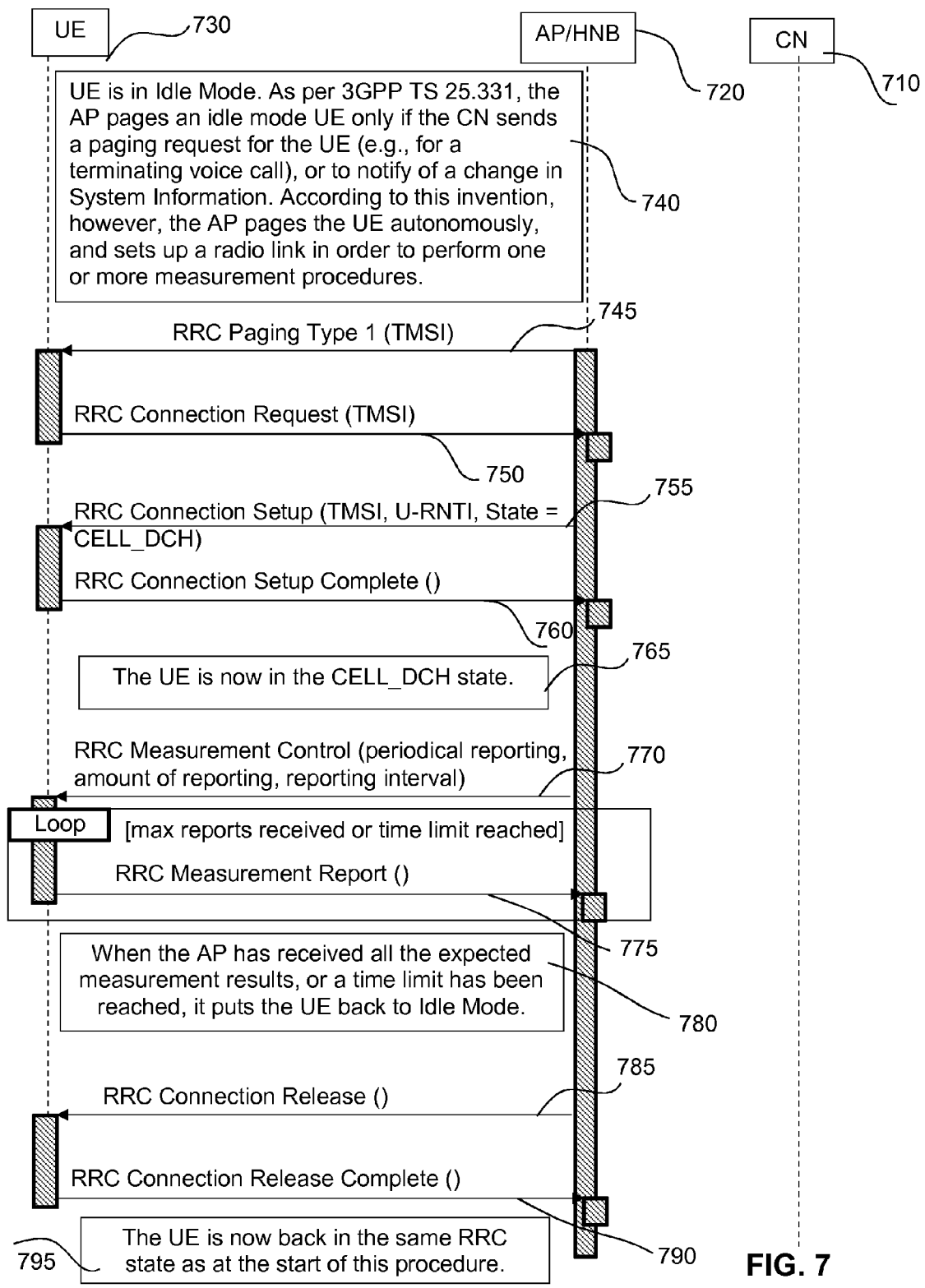
FIG. 7 illustrates an example of a message sequence chart of how a UTRAN generated paging message can be used to trigger a UE in an Idle Mode state to contact the cell in order to capture additional measurement reports.

FIG. 7 illustrates a message sequence chart example of an Access Point autonomously paging a UE in an Idle Mode state. The message sequence chart comprises communications between a core network (CN) 710, a 3GAP/HNB 720 and a UE 730. The method of operation at the access point (AP), say AP 130 of FIG. 1 and FIG. 2, starts at 740, with the UE in an idle mode state. In known 3GPP systems, the AP 720 pages the idle mode UE 730 only if the core network (CN) sends a paging request for the UE (e.g. for terminating a voice call) or to notify the UE 730 of a change in System Information. However, in accordance with example embodiments, the AP 720 may page the UE 730 autonomously, and thus sets up a radio link in order to perform one or more measurement procedures. In this manner, the 3GAP 720 sends a RRC paging-type 1 message (including a TMSI) to the UE 730, as shown in 745. In response to the paging message, the UE 730 sends in 750 a radio resource control (RRC) connection request message using the TMSI. The 3GAP 720 returns a RRC connection setup message to the UE 730 in 755. Once completed, the UE 730 sends a RRC connection setup complete message to the 3GAP 720, as shown in 760. The UE is now in the Cell_DCH state or CELL_FACH state, depending on what the AP instructs in the RRC Connection Setup message, as shown in 765.

In 770, the 3GAP 720 sends one or more RRC Measurement control messages to UE 730, for example requesting periodic reporting. In 770, 775, the UE 730 may collect and send to 3GAP 720 several (for example periodic) measurement reports. As shown in 780, this measurement process will ultimately expire, for example when the 3GAP 720 has received all of the expected measurement results, or a time limit has been reached. At this time the 3GAP 720 sends the UE a RRC connection release message 785. The UE 730 returns a RRC connection release complete message 790 to the 3GAP 720 and the UE 730 is now in the earlier RRC state, Idle Mode, 795.

Figure 8:
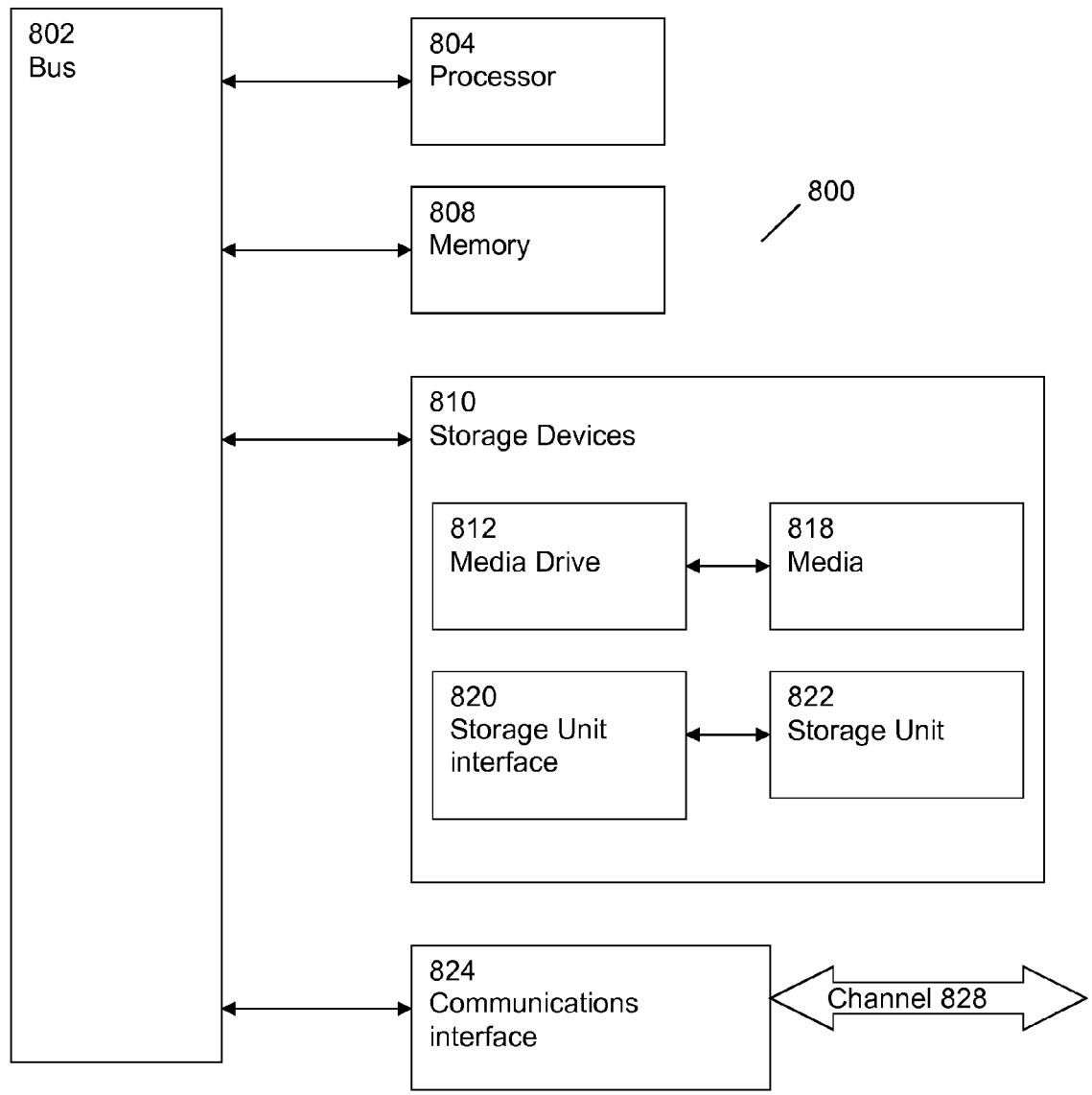
FIG. 8 illustrates a typical computing system that may be employed to implement signal processing functionality in example embodiments.

Referring now to FIG. 8, there is illustrated a typical computing system 800 that may be employed to implement signal processing functionality in embodiments of the invention. Computing systems of this type may be used in access points (HNBs), base transceiver stations and wireless communication units. Those skilled in the relevant art will also recognize how to implement the invention using other computer systems or architectures. Computing system 800 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control module. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to tangible media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control module (in this example, software instructions or executable computer program code), when executed by the processor 804, causes the processor 804 to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or an integrated circuit such as an application-specific integrated circuit (ASIC) and/or any other sub-system element.

It will be appreciated that, for clarity purposes, the above description has described embodiments of the invention with reference to a single signal processing module. However, the inventive concept may equally be implemented by way of a plurality of different functional units and processors to provide the signal processing functionality. Accordingly, it will be understood that the term 'signal processing module' used herein is intended to encompass one or more signal processing functional units, circuits and/or processors. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A communication system comprising a core network operably coupled to a network element arranged to support wireless communications to a terminal device, wherein the network element comprises a control processor arranged to:
   support setting up of an air interface connection with the terminal device to communicate with the core network;
   receive an instruction from the core network via a core network connection to release the air interface connection with the terminal device;
   in response thereto maintain the air interface connection with the terminal device for an extended time to facilitate at least one non-core network communication between the network element and the terminal device,
   use the extended time to collect measurements from the terminal device; and
   delay forwarding the instruction from the core network to release the air interface connection with the terminal device until the network element has received the measurements from the terminal device.

2. The communication system of claim 1 wherein the control processor maintains the air interface connection with the terminal device by delaying forwarding an indication of a termination of the core network connection to the terminal device until the terminal device has completed a measurement requested by the network element.

3. The communication system of claim 1 wherein the control processor is arranged to maintain the air interface connection involving at least one from the group consisting of: a location update procedure, a short message service, a background signalling procedure initiated by the terminal device and the network element.

4. The communication system of claim 1 wherein the control processor augments a signalling procedure to the terminal device with a measurement command for the terminal device to perform at least one measurement procedure.

5. The communication system of claim 1 wherein the measurement command comprises a request to the terminal device to measure and report at least one neighbour cell received characteristic to the network element.

6. The communication system of claim 1 wherein the control processor is further arranged to instruct the terminal device to perform and report one or more of: at least one inter-RAT measurement, at least one inter-Frequency measurement, and at least one intra-Frequency measurement.

7. The communication system of claim 1 wherein the at least one non-core network communication between the network element and the terminal device comprises the core network being unaware that the at least one non-core network communication is being performed.

8. The communication system of claim 1 wherein the control processor is further arranged to:
autonomously page the terminal device in order to create an air interface connection with the terminal device such that communication between the network element and the terminal device is not initiated by the core network.

9. The communication system of claim 8 wherein a paging procedure initiated by the network element comprises at least one from the group consisting of: paging an Idle Mode terminal device, paging a CELL_PCH state terminal device, paging a URA_PCH state terminal device.

10. The communication system of claim 8 wherein the control processor sends to the terminal device a measurement command for the terminal device to perform at least one measurement procedure within a time period provided by the autonomously created air interface connection.

11. The communication system of claim 10 wherein the measurement command comprises a request to the terminal device to measure and report at least one neighbor cell received characteristic to the network element.

12. The communication system of claim 10 wherein the control processor is further arranged to instruct the terminal device to perform and report one or more of: at least one inter-RAT measurement, at least one inter-Frequency measurements, and at least one intra-Frequency measurement.

13. The communication system of claim 8 wherein the control processor is further arranged to instruct the terminal device to perform blind detection of at least one neighbor cell.

14. The communication system of claim 8 wherein the paging procedure triggers a cell update procedure to be performed by the terminal device when the terminal device is in a CELL_PCH or URA_PCH state.

15. The communication system of claim 8 wherein a paging procedure triggers a radio resource control (RRC) connection establishment procedure to be performed by the terminal device when the terminal device is in an Idle Mode state.

16. The communication system of claim 8 wherein the control processor is further arranged to process one or more measurements from the terminal device at a radio resource management layer.

17. A network element for operably coupling to a core network in a communication system and arranged to support wireless communications to a terminal device, wherein the network element comprises a control processor arranged to:
support setting up of an air interface connection with the terminal device to communicate with the core network;
receive an instruction from the core network via a core network connection to release the air interface connection with the terminal device; and
in response thereto maintain the air interface connection with the terminal device for an extended time to facilitate at least one non-core network communication between the network element and the terminal device,
use the extended time to collect measurements from the terminal device; and
delay forwarding the instruction from the core network to release the air interface connection with the terminal device until the network element has received the measurements from the terminal device.

18. The network element of claim 17 wherein the control processor is further arranged to:
autonomously page the terminal device in order to create an air interface connection with the terminal device such that communication between the network element and the terminal device is not initiated by the core network.

19. The network element of claim 17 wherein the network element is implemented in an integrated circuit device.

20. A method for supporting wireless communications to a terminal device in a communication system comprising a network element being operably coupled to a core network, the method comprising, at the network element:
setting up of an air interface connection with the terminal device to communicate with the core network;
receiving an instruction from the core network via a core network connection to release the air interface connection with the terminal device; and in response thereto,
maintaining the air interface connection with the terminal device for an extended time to facilitate at least one non-core network communication between the network element and the terminal device,
using the extended time provided by the maintained interface connection to collect measurements from the terminal device
use the extended time to collect measurements from the terminal device; and
delaying forwarding the instruction from the core network to release the air interface connection with the terminal device until the network element has received the measurements from the terminal device.

* * * * *